UNITED STATES PATENT OFFICE 2,037,213

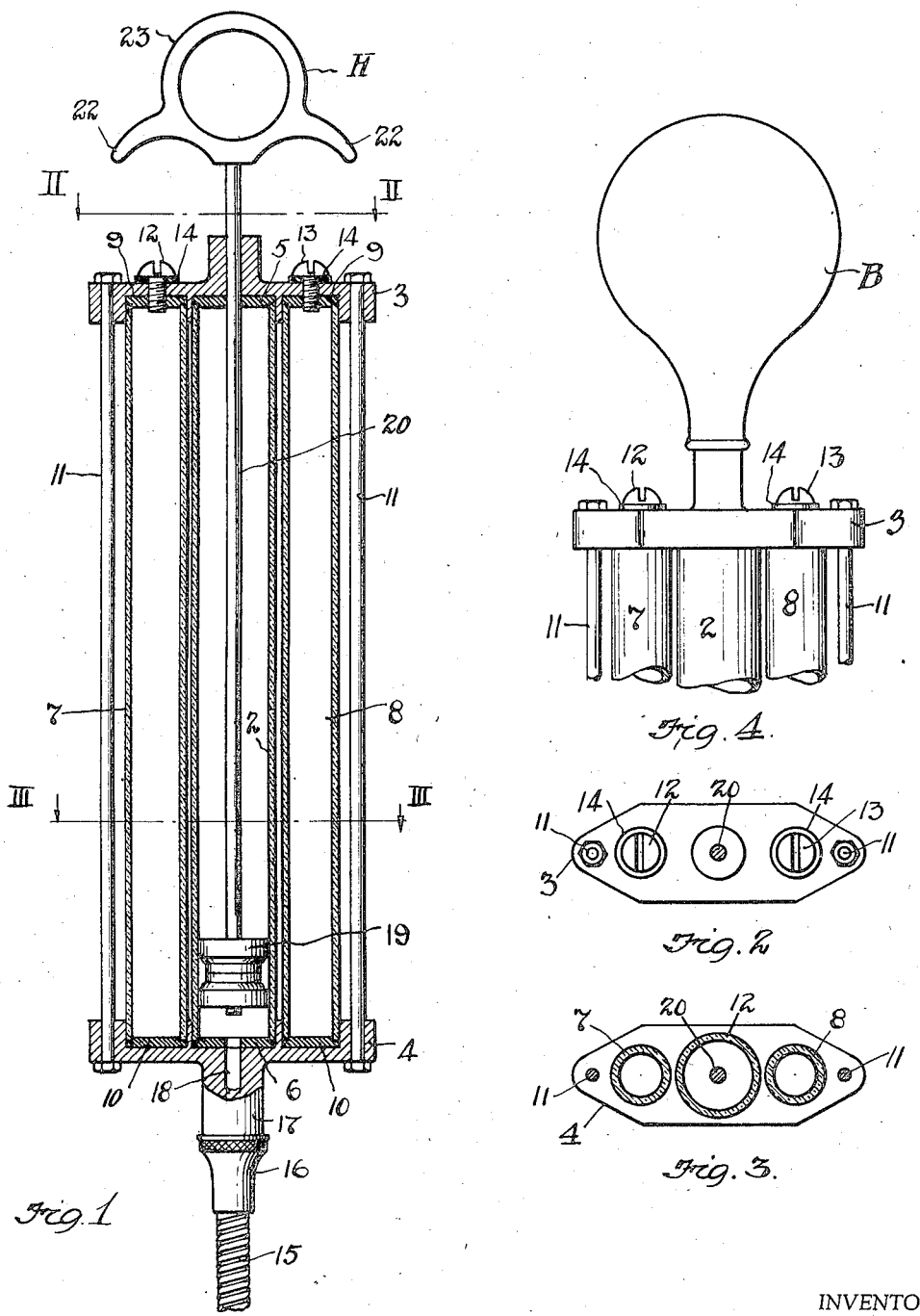

CRANKCASE OIL COMPARATOR

Edson L. Cannon, Cleveland Heights, Ohio, assignor to The Warren Refining and Chemical Company, Cleveland, Ohio, a corporation of Ohio Application October 6, 1932, Serial No. 636,614

2 Claims. (Cl. 88—14)

In automobile lubrication practice, it has been the working rule that crank case oil should be changed after five hundred to one thousand miles running. This however, ignores other important factors, such as the amount of idling, differences in piston ring leakage, differences in over-heating from defective firing or cooling conditions, etc. Experience shows that the actual condition of crank case oil varies so widely in different machines that change by reference to speedometer reading is unreliable and unsafe. In accordance with the present invention however, a determination of the condition of crank case oil is positive at any time, and uncertainties may be eliminated.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

Fig. 1 is a longitudinal sectional view of an embodiment of the invention; Fig. 2 is a sectional view of the same taken on a plane indicated by line II—II, Fig. 1; Fig. 3 is a transverse section taken on a plane indicated by line III—III, Fig. 1; and Fig. 4 is a fragmentary elevational view of a modification.

In its general aspects, the invention contemplates a visibility chamber with means for filling from the oil to be tested, and a comparison standard alongside such chamber, whereby to afford quick and convenient determination of the oil condition. As shown in Fig. 1, the visibility chamber for the oil to be tested is in the form of a glass cylinder 2, mounted between an upper yoke member 3 and a lower yoke member 4, as by seating in appropriate recesses, packed by suitable washers 5, 6. Alongside of the glass cylinder 2 are additional glass cylinders 7, 8. These latter may be similarly mounted between the yoke members 3, 4, and being packed by suitable washers 9, 10. The entire assemblage may be separably held together by stem-bolts 11. Access to the comparison chambers or tubes 7, 8, may be provided by the removable plugs, for instance in the form of screw-plugs 12, 13, having suitable packing washers 14. By such arrangement, the comparison standards may be conveniently supplied to the chambers 7, 8.

In order to fill the visibility chamber or tube 2, a stem of suitable length to afford access to the crank case from which the sample is to be taken, is provided, and in the form illustrated this may comprise a flexible tube 15 of any convenient or preferred length, for example eighteen inches or two feet, to allow wide versatility of application, and such tube may be attached by screw connection through a connector 16 threading onto a nipple 17 integral with the yoke 4 and having a bore 18 through to the inside of the tube 2. In the latter, a piston 19 is reciprocably mounted, being carried by piston rod 20 which is manually operated by a handle H. By incorporating finger-grip lugs 22, and a ring 23, the handle may be not only convenient for grasping, but may be also employed for hanging or suspending the device when not in use.

The manner of testing will be apparent from the foregoing. A sample of "burnt" oil or oil which has been used to a condition where it is immediately discardable, is filled into the visibility tube 7 say, and a standard sample of fresh clean oil is filled into the other visibility tube 8. Removal of the top screw plugs 12, 13, permits this, and with the plugs then tightened down into place, such comparison samples may be sealed up for use indefinitely, and irrespective of changes in position of the device, are always available. The nozzle or sampling tube 15 of the device is introduced into the crank case of the engine, the breather cap being removed, and the handle H is retracted, drawing the oil from the engine crank case up through the tube 15 and into the visibility chamber 2. The entire device may now be taken to a well lighted position, and oil in the compartment 2 is compared with the standards, by reflected or transmitted light, or both. The appearance of the oil, as to its darkness and lack of translucency due to suspended carbon and sludge, may be readily determined alongside the standard samples.

In the form of the device shown in Fig. 4, instead of a reciprocating piston as filling means, a more compact assembly employing a compressible bulb B is had. Again, in use, the oil to be tested is drawn up into the chamber or tube 2, and is compared with the standard samples in the tubes 7, 8.

In its various forms thus, a highly advantageous testing device is made accessible to filling station attendants and other users, permitting rapid and accurate determinations of crank case oil condition, and promoting accuracy of lubrication practice.

Other modes of applying the principle of the invention may be employed, change being made as regards the details described, provided the features stated in any of the following claims, or the equivalent of such, be employed.

I therefore particularly point out and distinctly claim as my invention:

1. A crank case oil comparator comprising a hand portable device having a conduit connected thereto adapted to be inserted in a crank case; said device consisting of upper and lower yoke members, bolts, and glass tubes, recesses in said yoke members adapted to receive said glass tubes, and an opening in the upper yoke member communicating with one of said glass tubes whereby oil may be received and drained from said last named glass tube, an opening in the lower yoke member communicating with another glass tube and said conduit and means present for drawing crank case oil to be tested into said latter tube, said bolts engaging said yoke members and clamping said tubes between such members in assembled relationship, whereby oil which has been drawn from a crank case may be immediately compared.

2. A crank case oil comparator comprising a hand portable device having a conduit connected thereto adapted to be inserted in a crank case; said device consisting of upper and lower yoke members, bolts, and three glass tubes for receiving new oil, crank case oil and used oil respectively, recesses in said yoke members adapted to receive said glass tubes, and openings in the upper yoke member communicating with two of said glass tubes whereby oil may be received and drained from said last named glass tubes, an opening in the lower yoke member communicating with another glass tube and said conduit and means present for drawing crank case oil to be tested into said latter tube, said bolts engaging said yoke members and clamping said tubes between such members in assembled relationship, whereby oil which has been drawn from a crank case may be immediately compared.

EDSON L. CANNON.